3,705,167
BENZOTHIOPYRAN COMPOUNDS

Charles Malen, Fresnes, Bernard Danree, St.-Germain-en-Laye, and Michel Laubie, Vaucresson, France, assignors to Science Union et Cie Societe Francaise de Recherche Medicale, Suresnes, France
No Drawing. Filed Apr. 13, 1970, Ser. No. 28,016
Claims priority, application Great Britain, Apr. 25, 1969, 21,254/69
Int. Cl. C07d 29/36
U.S. Cl. 260—293.57                7 Claims

ABSTRACT OF THE DISCLOSURE

Benzothiopyran compounds of the formula:

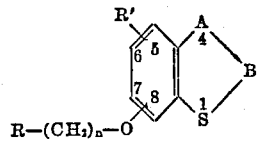

wherein A is methylene, hydroxymethylene or carbonyl; B is ethylene or vinylene which are optionally substituted by lower alkyl; $n$ is 2, 3 or 4; R is di-lower alkyl amino or pyrrolidino, piperidino, morpholino, hexamethylene-imino, 3-azabicyclo (3,3,0)-3-octyl, or all these heterocyclic radicals substituted by one or more lower alkyls; and R' is hydrogen or halogen.

These compounds possess cardiovascular and circulatory properties.

---

The present invention provides benzothiopyran compounds of the general Formula I:

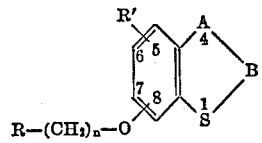 (I)

wherein:

A is selected from the group consisting of methylene (—CH$_2$—), hydroxymethylene

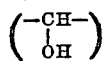

and carbonyl

radicals;

B is selected from the group consisting of ethylene (—CH$_2$—CH$_2$—) and vinylene (—CH=CH—) radicals, each being optionally monosubstituted by a lower alkyl radical containing from 1 to 5 carbon atoms inclusive;

$n$ is an integer from 2 to 4 inclusive;

R is an amino radical selected from the group consisting of di-lower alkyl amino radicals wherein the alkyl moiety has from 1 to 5 carbon atoms inclusive, pyrrolidino, piperidino, morpholino, hexamethylene-imino, 3-aza bicyclo (3,3,0)-3-octyl radicals, each of these heterocyclic radicals being optionally substituted by one or more lower alkyl radicals containing from 1 to 5 carbon atoms inclusive; and R' is selected from the group consisting of a hydrogen atom and a halogen atom selected from a chlorine, bromine and fluorine atom.

The new compounds of the general Formula I are bases; they are mostly in the form of a thick oil which can be distilled under a high vacuum. These bases form well defined crystalline salts with mineral or organic acids. Among the acids used to form these salts there may be mentioned, in the mineral series, hydrochloric, hydrobromic, sulfuric, phosphoric acids, and in the organic series, acetic, propionic, maleic, fumaric, tartaric, citric, oxalic, benzoic, methane sulfonic acids etc. These salts, which are in general readily soluble in water at a substantially neutral pH value, are also included in the present invention.

Additionally, the compounds of the general Formula I, in which B represents an ethylene group monosubstituted by a lower alkyl group containing 1 to 5 carbon atoms inclusive, contain an asymmetric carbon atom so that they exist in the form of optical isomers which are also included in this invention.

The new compounds are obtained by reacting a hydroxybenzothiopyran of the general Formula II:

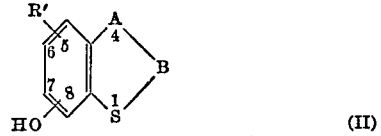 (II)

wherein A, B and R' have the above meanings, with a halogenalkyl amine of the general Formula III:

R—(CH$_2$)$_n$—X            (III)

wherein R and $n$ have the above meanings and X represents a chlorine or bromine atom.

The reaction may be carried out in a suitable organic solvent, for example, an aliphatic alcohol, a hydrocarbon or a classic aprotic solvent, in the presence of an acceptor for the hydrohalic acid formed during the reaction.

Some hydroxylated compounds of the general Formula II, used as starting materials, have been described in British Pat. No. 1,158,473. Those hydroxylated compounds which are new are described below in the examples.

Furthermore, the compounds of the general Formula I, in which A represents a methylene or hydroxymethylene group, can also be prepared by the conventional reducing methods from compounds of the general Formula I, in which A represents a carbonyl group.

The compounds of the general Formula I and their physiologically tolerable salts possess valuable pharmacological and therapeutic properties, especially cardiovascular properties and may be used as medicine.

Their toxicity is low and the LD$_{50}$, studied in mice, varies from 75 to 465 mg./kg. by the intraperitoneal route and from 260 to 1500 mg./kg. by the oral route.

Administered to the anesthetized dog at doses of 0.5 to 5 mg./kg. by the intravenous route, the compounds of the invention increase the blood pressure, essentially the systolic pressure, from 10 to 40 mm. Hg. The cardiac rhythm is not modified, but an increase of the cardiac output from 10 to 30% and an increase of the venous return to the right heart are observed.

An increase of the cardiac output is also observed in animals pretreated with pharmacodynamic agents which decrease the cardiac output, either by the depletion of catecholamines, such as reserpine, by the inhibition of adrenergic receptors, such as propranolol or dibenamine, by the ganglionic block such as hexamethonium, or by the inhibition of the central sympathetic tonus, such as clomidine.

These results show an improvement of the cardiac output and of the blood pressure and allow the use of the new compounds in therapy, especially in the treatment of cardiac insufficiency, arterial and venous circulation disorders, shock state, hypotension and migraine.

The new compounds can be administered in various pharmaceutical forms, by the oral, rectal or parenteral route, in admixture or conjunction with a suitable pharmaceutical carrier, such, for example, as distilled water, glucose, lactose, talc, magnesium stearate, ethyl cellulose and cocoa butter.

Doses may vary from 10 to 100 mg. and be administered 1 to 5 times a day.

The following examples illustrate the invention. The melting points were determined on a Kofler block (K.B.).

EXAMPLE 1

8-piperidinoethyloxy thiochroman citrate

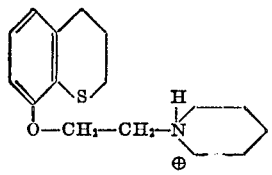 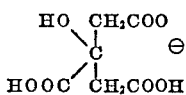

While agitating a methanolic sodium methylate solution prepared from 30.5 g. (1.36 mols) of sodium and 540 ml. of methanol, 191 g. (1.36 mols) of redistilled orthomethoxythiophenol were added drop by drop.

Separately, a solution of 148 g. (1.36 mols) of β-chloropropionic acid of 100% strength in 540 ml. of methanol and 135 ml. of water was accurately neutralized with 54.5 g. (1.36 mols) of sodium hydroxide (100% pure) in 240 ml. of water at +5° C., while preventing any heating up of the batch. The resulting solution of sodium β-chloropropionate was run during 15 minutes into the solution of sodium orthomethoxythiophenate prepared as described above while agitating the whole well. The mixture was refluxed for 4 hours, and the methanol was then distilled off. The aqueous residue was diluted with 2 volumes of water, filtered and adjusted with hydrochloric acid to a pH value of 1 to 2.

β-(orthomethoxyphenyl - mercapto) propionic acid settled out in the form of an oil which crystallized by seeding. The mixture was triturated, suctioned off and washed with water, to yield after drying in a stove, 264.5 g. of β-(orthomethoxyphenyl-mercapto) propionic acid melting at 91–93° C. Yield: 89%.

125 grams (0.59 mol) of this crude acid were added portionwise to a solution of 200 ml. of thionylchloride in 500 ml. of anhydrous benzene. The mixture was refluxed for 2 hours and then evaporated to dryness. The residue was taken up with 1200 ml. of anhydrous benzene and while stirring well, 300 g. (2.25 mols) of aluminum chloride were added portionwise. Stirring was continued for 2 hours; the mixture was then left to stand for 48 hours and then hydrolyzed cautiously with water and hydrochloric acid. The expected phenolic compound settled out partially and dissolved partially in the benzene. The precipitate which consisted of 8-hydroxy thiochroman-4-one in the crude state, was centrifuged and the benzene decanted. The benzenic part was extracted with 2× 100 ml. of 10% sodium hydroxide solution and then with water. The basic parts were combined with the centrifuged product, and while stirring the whole, 100 ml. of 10% sodium hydroxide solution were added until all had dissolved. The mixture was filtered and reacidified to a pH value of 4 by means of hydrochloric acid, while preventing any heating up.

After centrifuging, washing with water and drying in a drying oven, there were obtained 63.2 g. of 8-hydroxy thiochroman-4-one, melting at 225–232° C., in a yield of 60%.

40 grams of 8-hydroxy thiochroman-4-one were added portionwise to a mixture of 53.5 ml. of hydrazine hydrate and 220 ml. of ethanol. The reaction mixture was refluxed for 1 hour and then evaporate to dryness in vacuo. The residue was taken up in 250 ml. of ethyleneglycol, and then 22.1 g. of sodium hydroxide were added in pellet form. The whole was heated to refluxing, while the water of reaction was distilled off as it is formed. The mixture was then heated for 4 hours at 200° C., allowed to cool and the bulk of glycol was expelled under vacuum. The residue was diluted with water and then acidified. The liberated phenol was extracted with chloroform. The chloroform extract was dried and evaporated and the residue distilled under vacuum to yield 20.1 g. of 8-hydroxy thiochroman, boiling at 105–110° C. under 0.08 mm. Hg pressure, in a yield of 55%. After recrystallization from cyclohexane, it melted at 86–88° C.

120 ml. of an N-ethanolic potassium hydroxide solution were added to a solution of 20 g. of 8-hydroxy thiochroman in 120 ml. of ethanol. The mixture was heated to refluxing and then, while stirring it, 17.6 g. of freshly distilled 1-piperidino-2-chloroethane were added during 1 hour. At the point where the pH value of the reaction mixture was reversed, the heating was stopped. The solvent was evaporated and the aminated product isolated by extraction in a suitable medium.

The organic extract was evaporated under vacuum, to yield 30 g. of crude 8-piperidinoethyloxy thiochroman (of 90% purity).

26.3 grams of 8-piperidinoethyloxy thiochroman thus obtained were dissolved in 100 ml. of ethanol and added to a solution of 16.8 g. of citric acid monohydrate in 50 ml. of ethanol.

The whole was refluxed for 15 minutes and then kept overnight at 0 to 5° C. and suctioned. The resulting crude citrate was recrystallized from acetonitrile. Yield: 25.8 g. of 8-piperidinoethyloxy thiochroman citrate which melted instantaneously at 128–130° C.

EXAMPLES 2–23

The following compounds with their substituents and melting points indicated in the table below, were manufactured by the process described in Example 1:

| Ex. | A | B | n | R | R' | Position of $-O-(CH_2)_n-R$ on the ring | Isolated form | M.P. (K.B.), °C. |
|---|---|---|---|---|---|---|---|---|
| 2 | $-CH_2-$ | $-CH_2-CH_2$ | 2 | $-N\bigcirc$ | H | 8 | Maleate hemihydrate | 110–113 |
| 3 | $-CH-$ $\quad\;$ $OH$ | $-CH_2-CH_2-$ | 2 | Same as above | H | 8 | Fumarate | 175–177 |
| 4 | $-C-$ $\;\;\|\!\!|$ $\;O$ | $-CH=CH-$ | 3 | $-N\begin{smallmatrix}C_2H_5\\C_2H_5\end{smallmatrix}$ | H | 8 | Hydrochloride | 160–164 |
| 5 | Same | $-CH=CH-$ | 3 | Same as above | H | 6 | do | 214–217 |

TABLE—Continued

| Ex. | A | B | n | R | R' | Position of —O—(CH₂)ₙ—R on the ring | Isolated form | M.P. (K.B.) °C. |
|---|---|---|---|---|---|---|---|---|
| 6 | —C(=O)— | CH₃, —C=CH— (2)(3) | 2 | —N(CH₃)CH₃ | H | 6 | Hydrochloride | ¹130 |
| 7 | Same | Same as above | 2 | —N(C₂H₅)C₂H₅ | H | 6 | ...do... | ¹180 |
| 8 | ...do... | ...do... | 3 | Same as above | H | 6 | ...do... | 163-167 |
| 9 | ...do... | —CH=CH— | 2 | —N⟩O (morpholino) | H | 8 | ...do... | ¹>250 |
| 10 | ...do... | CH₃, —C=CH— (2)(3) | 2 | Same as above | H | 6 | ...do... | ¹215-230 |
| 11 | ...do... | —CH₂—CH₂— | 2 | —N(CH₃)CH₃ | H | 8 | ...do... | 190-192 |
| 12 | ...do... | —CH₂—CH₂— | 3 | —N(C₂H₅)C₂H₅ | H | 8 | ...do... | |
| 13 | ...do... | —CH₂—CH₂— | 2 | —N⟩ (pyrrolidino) | H | 8 | Hydrochloride monohydrate | 115 |
| 14 | ...do... | —CH₂—CH₂— | 2 | —N⟩ (piperidino) | H | 8 | Hydrochloride | 175-177 |
| 15 | ...do... | CH₃, —CH—CH₂— (2)(3) | 2 | Same as above | H | 8 | ...do... | 190-192 |
| 16 | ...do... | CH₃, —CH₂—CH— (2)(3) | 2 | ...do... | H | 8 | ...do... | 188-190 |
| 17 | ...do... | —CH₂—CH₂— | 2 | ...do... | Cl (5) | 8 | ...do... | 209-212 |
| 18 | ...do... | —CH₂—CH₂— | 2 | —N⟩ with CH₃, CH₃ | H | 8 | ...do... | 240-242 |
| 19 | ...do... | —CH—CH₂— (2)(3), CH₃ | 2 | —N⟩O | H | 6 | ...do... | 202-204 |
| 20 | ...do... | —CH₂—CH₂— | 2 | Same as above | H | 8 | ...do... | 212-218 |
| 21 | ...do... | —CH₂—CH₂— | 3 | ...do... | H | 8 | ...do... | 193-195 |
| 22 | ...do... | —CH₂—CH₂— | 2 | —N⟩ (hexamethyleneimino) | H | 8 | ...do... | 178-181 |
| 23 | ...do... | —CH₂—CH₂— | 2 | —N⟩ (3-azabicyclo[3.3.0]octyl) | H | 8 | Hydrochloride monohydrate | 140 |

¹ Decomposition.

We claim:
1. A compound selected from the group consisting of:
(A) benzothiopyran compounds of the general formula

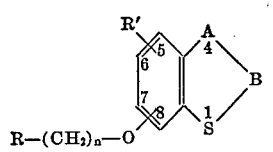

wherein:
A is selected from the group consisting of methylene, hydroxymethylene and carbonyl;
B is selected from the group consisting of ethylene and lower alkylethylene;
n is an integer from 2 to 4 inclusive;
R is selected from the group consisting of di-lower alkylamino, pyrrolidino, piperidino, morpholino, hexamethylene imino, 3-aza bicyclo (3,3,0)-3-octyl, lower alkylpyrrolidino, lower alkylpiperidino, lower alkylmorpholino, lower alkylhexamethylene imino and lower alkyl-3-aza bicyclo (3,3,0)-3-octyl; and
R' is selected from the group consisting of hydrogen and halogen; and
(B) physiologically tolerable addition salts with mineral or organic acids.

2. A compound of claim 1 which is 8-piperidinoethyloxy thiochroman.

3. A compound of claim 1 which is *dl* 8-piperidinoethyloxy thiochroman-4-ol.

4. A compound of claim 1 which is 8-pyrrolidinoethyloxy thiochromanone.

5. A compound of claim 1 which is 5-chloro-8-piperidinoethyloxy thiochromanone.

6. A compound of claim 1 which is 8-hexamethyleneiminoethyloxy thiochromanone.

7. A compound of claim 1 which is 8-[(3-aza bicyclo (3,3,0)-3-octyl) ethyloxy] thiochromanone.

References Cited
UNITED STATES PATENTS
3,506,654  4/1970  Fried _____ 260—293.57

HENRY R. JILES, Primary Examiner

S. D. WINTERS, Assistant Examiner

U.S. Cl. X.R.

260—327 TH, 326.5 SA, 247.1, 516; 424—267, 274, 248, 275